July 21, 1964     E. V. SCHNEIDER     3,141,233

ROTOR AND SHAFT ASSEMBLY METHOD

Original Filed Jan. 13, 1959

INVENTOR.
EMMOR V. SCHNEIDER

United States Patent Office 3,141,233
Patented July 21, 1964

3,141,233
ROTOR AND SHAFT ASSEMBLY METHOD
Emmor V. Schneider, Alliance, Ohio, assignor to The Alliance Manufacturing Company, Division of Consolidated Electronics Industries Corp., a corporation of Delaware
Original application Jan. 13, 1959, Ser. No. 786,560. Divided and this application Feb. 23, 1960, Ser. No. 10,499
10 Claims. (Cl. 29—155.53)

The invention relates in general to rotor and shaft assemblies and more particularly to such assemblies where the parts are fastened together without an interference fit. This application is a division of application Serial No. 786,560, filed January 13, 1959.

In the manufacture of small electric motors, especially those in the subfractional horsepower range, it has been an industrywide practice to fasten a rotor on its shaft by an interference fit between the largest diameter on the shaft and the hole in the rotor. In the larger sizes, of course, where the shaft becomes one-half inch in diameter or larger it is common practice to key the rotor on the shaft, but in these smaller sizes wherein the shaft is in the order of ⅛ inch in diameter this keying becomes impractical, and knurling or splining is commonly used.

Small induction motors have been used for many years for driving phonographic turntables since only a small amount of torque is required; consequently, induction motors with output torque of 1 ounce inch are satisfactory. These small motors may have a shaft diameter in the order of .15 or .20 inches. The prior art practice has been to use an interference fit and to press the shaft into a slightly under-size hole in the rotor. The shaft is long relative to its diameter and when such a shaft is pressed through the hole in the shaft it tends to become deformed from its previous degree of straightness much as a hair is twisted and tends to curl along its length when being drawn through a hole smaller than its own diameter.

Perhaps the most aggravating problem today in the manufacture of small electric motors for phonograph drives is the problem of rumble which is primarily caused by lack of trueness of the rotor of the motor. This is being complicated by the increasing use of stereophonic phonograph equipment. This lack of trueness takes several forms, one of which is the dynamic balance of the rotor, and the second of which is the trueness of the rotor shaft drive portion, which is effective as a pulley or friction drive in driving the turntable through an idler wheel. The fact that the rotor is not perfectly dynamically balanced causes the entire motor to shake, which in turn imparts a vibration to the turntable and to the tone arm assembly, creating undesirable and annoying responses when a record is played on the phonograph. The second of these effects is trueness of the shaft at the point of contact between the pulley section of the shaft and the idler wheel, which does not directly shake the motor, but will cause the idler wheel to vibrate, setting up vibration throughout the turntable, tone arm, etc.

Considerable progress has been made toward closer and closer tolerances, but tolerances below levels of .0005 of an ounce inch of unbalance and .0005 of an inch trueness of the motor shaft drive portion were not heretofore obtainable, or if obtained by mischance were impossible of being maintained in use.

Accordingly, an object of the invention is to provide the method of making a rotor secured on a shaft without an interference fit.

Another object of the invention is to provide a phonograph motor with an extremely low amount of rumble.

Another object of the invention is to provide a rotor and shaft assembly wherein the shaft is made straight within predetermined limits and the hole in the rotor is also made straight and of a diameter to receive the shaft with a slip fit and then securing the shaft in the rotor by an adhesive to fill the space between the shaft and the rotor, to thus maintain the shaft free of any stress during assembly so that the run-out of the shaft drive portion and the dynamic balance of the rotor and shaft assembly may be kept within exceedingly low limits during assembly of the entire phonograph in which the motor is used, as well as during shipment of the same and throughout use.

Another object of the invention is to provide a phonograph motor drive having a motor and shaft assembly wherein the shaft remains centered relative to the hole despite being subjected to side pressure as in use or frequently even when subjected to handling.

Another object of the invention is to provide an entirely new standard for vibration limits on electric motors and of rumble limits for these motors when mounted in phonograph record changers or players.

Another object of the invention is to provide a rotor and shaft assembly wherein the shaft need not be ground after assembly to attain straightness and trueness of the shaft.

Other objects and a fuller understanding of this invention may be had by referring to the following description and claims, taken in conjunction with the accompanying drawings, in which:

Figure 1:
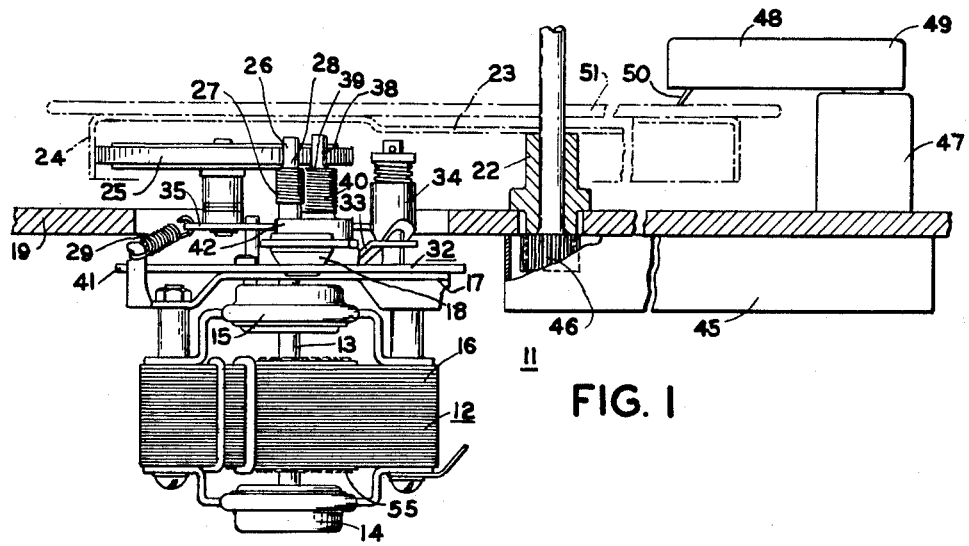
FIGURE 1 is a side elevational view partly in section of a complete phonograph drive mechanism.

FIGURE 1 shows a complete phonograph drive mechanism 11 in the form of a phonograph record changer as opposed to a record player type of mechanism. This drive mechanism 11 includes generally a subfractional horsepower shaded pole induction motor 12 having a shaft 13 mounted in bearings 14 and 15 fixedly attached to the stator 16 of the motor 12. The stator is dependently carried from a motor plate 17 and the motor plate itself is fastened by shock mounts 18 to a motor board 19 which may be the main support for the entire phonograph mechanism 11.

A bearing 22 is carried on the motor board 19 in any suitable manner and a turntable 23 is journalled on this bearing 22. The turntable 23 has a dependent annular flange 24 which is engageable by a friction tired idler wheel 25 in turn engageable with either step 26 or 27 of a cantilever or outboard drive shaft portion 28 of the shaft 13. An idler spring 29 urges the idler wheel 25 into engagement with the flange 24 and with the steps 26 and 27.

Some form of speed selector mechanism 32 may be provided to make the phonograph drive mechanism 11 a plural speed device, for example, the four speeds of 16⅔, 33⅓, 45 and 78 r.p.m. as are commonly in use today. This speed selector mechanism 32 may include a cam 33 acting on an axially movable hub 34 which is connected to an idler plate 35 on which the idler wheel 25 is journalled to axially move this idler wheel 25 into engagement with a selected one of the steps 26 or 27. Additionally, an auxiliary shaft 38 may have steps 39 and 40 and may be journalled on a speed selector lever 41 which is a part of the speed selector mechanism 32. This auxiliary shaft may be driven by a belt 42 from the main shaft 13 and upon appropriate arcuate movements of the speed selector lever 41 either of the auxiliary shaft steps 39 or 40 may move into driving engagement with the idler wheel 25.

A record changing mechanism 45 is shown in diagrammatic form as being driven from a pinion 46 rotating with the turntable 23. This record changing mechanism may be any of the well known types which operate through the mount 47 for a tone arm 48 and lifts as well as arcuately moves the tone arm 48 by acting on the rear end 49 of this tone arm 48. The tone arm, of course, carries a needle 50 for playback of audio frequencies on a record 51 carried on and rotated by the turntable 23.

The shaft 13 carries a rotor 55 between the bearings 14 and 15 for magnetic cooperation with the stator 16.

Figure 4:
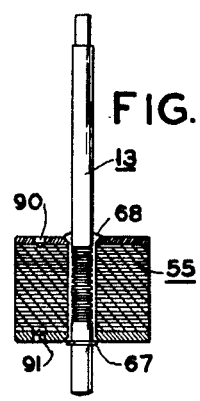
FIGURE 4 is a longitudinal sectional view of the rotor and shaft assembly.

The FIGURE 4 shows the shaft 13 and rotor 55 assembly removed from the motor and drive mechanism of FIGURE 1.

Figure 3:
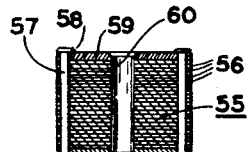
FIGURE 3 is a longitudinal sectional view of a rotor used in the motor of FIGURE 1.

FIGURE 3 shows the rotor 55 and since this is an alternating current motor, it is composed of a stack of magnetically permeable laminations 56. Each of these laminations is punched from sheet metal stock and then stacked to the proper height and pinned together with conductor pins 57 headed at 58 to a copper or other conductive plate 59 to form a squirrel cage structure for this induction motor rotor. The inside diameter of the hole 60 is necessarily rough from the individual laminations and from the burrs caused by stamping. This hole 60 may first be drilled if necessary for rough sizing, and then reamed to achieve a working diameter which in one particular embodiment is within the tolerance limits of .1820 to .1830 inch. This is with a lamination stack height of approximately .75 inch. One end of the hole 60 is preferably chamfered at 61.

Figure 2:
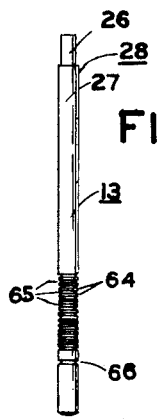
FIGURE 2 is a side elevational view of a motor shaft used in the drive mechanism of FIGURE 1.

The shaft 13 is shown separately in FIGURE 2 and has at one end the outboard drive shaft portion 28 consisting of the drive shaft steps 26 and 27. An intermediate portion 64 of the shaft 13 is roughened, that is, it is noncylindrical, to aid in the adhesive securing of the rotor to the shaft. This roughening may be done in several ways but in practice a satisfactory method has been to cut a closely spaced series of annular grooves 65 perhaps .003 to .010 inch deep, to be spaced approximately 40 to the inch. These grooves are necessarily exaggerated in size in FIGURE 2 because of the drawing laminations. A locking groove 66 may also be provided near the lower end of the shaft. After this cutting of the drive shaft step 26 and the roughening and locking grooves 65 and 66, the shaft 13 may be ground to make it straight and true within desired machining limits. This grinding produces about a 25 microinch finish on the entire surface of the shaft and the shaft is next polished to achieve a 10 microinch finish. In one particular embodiment to be used with the rotor 55, the shaft has an O.D. of .1812 to .1815 inch throughout its entire length except, of course, for the step portion 26.

With the above tolerances on the shaft O.D. and the rotor hole I.D., the shaft 13 has a slip fit as opposed to an interference fit with the rotor, with a clearance between the shaft and the rotor hole of between .0005 and .0018 of an inch. Before assembly the shaft and rotor are each separably covered with a film of adhesive, that is, the interior of the hole is swabbed and the roughened portion 64 is also coated. A C-shaped locking ring 67 is put on the shaft and the shaft inserted through the hole 60, drive shaft portion 28 first. The C-shaped locking ring 67 aids in accurately positioning the rotor axially on the shaft and in practice the assembly may be made upside down relative to that shown in FIGURE 4 so that the rotor may be held in a carrier and the shaft 13 retained in the rotor by gravity. The chamfer 61 provides a small sink for retention of a small surplus of adhesive so that it will be certain that adhesive completely fills the small clearance space between the rotor and shaft.

The adhesive may be anything suitable and one suitable adhesive has been a long chain polymer which is a clear transparent resin sold under the trademark of Loctite Sealant which hardens when in contact with two metal surfaces.

Another satisfactory adhesive is Eastman Kodak Company's glue #910. Other thermosetting resins and adhesives may be used depending upon the type of assembly conditions desired.

The assembly shown in FIGURE 4 may be set aside to permit the adhesive to harden but most adhesives harden or set quicker by application of heat and consequently, the assembly shown in FIGURE 4 may be subjected to a vapor degreasing operation, which is a heated solvent which not only helps to remove any excess adhesive on the exposed surface of the assembly but also helps to set the adhesive. The sink of adhesive at the chamfer 61 helps provide a supply of adhesive in case additional adhesive is drawn into any voids in the space between the shaft and rotor.

After the adhesive has set the assembly is very secure and it has been found that it requires from 700 to 1000 pounds or even higher axial force to separate the shaft and rotor. This high adhesion between the shaft and rotor is desired because one of the most aggravating problems in phonograph motor drives is that during shipment especially, the cartons will be thrown or dropped and this places a great axial force on the rotor relative to the shaft caused by the weight and inertia of the rotor. Because of these high stresses, occurring during shipment especially, it has been the former practice to provide an interference fit between the shaft and the rotor.

It is not known to the inventor's full satisfaction whether the fastening secured is fully due to an adhesive action. The fluid adhesive has been shown to seep into the spaces between the laminations 56 and into the grooves 65 of the rotor shaft, and thus the laminated rotor may be considered as having a roughened bore. Upon hardening, part or all of the fastening strength may be due to the formation of an interfering fit which, however, does not stress the shaft.

Dynamic unbalance of the rotor and shaft assembly causes shake at the frequency of rotation of the rotor. For the 60 cycle alternating current frequencies now in common use in the United States today, this is about 57 cycles rotational frequency for these small two pole induction motors. This shake or vibration at about 57 cycles, and to a more limited extent the third harmonic thereof, is at the low end of the audible frequency range of the human ear. This is why it is termed rumble in the phonograph art because it manifests itself by a low frequency noise. This vibration of the rotor and shaft assembly is transmitted through the bearings to the motor support and through this motor support to the record changing mechanism 45. In record changers especially the problem is aggravated because the tone arm 48 must be at least semi-rigidly connected at the rear end to the motor board and record changing mechanism 45 in order that the tone arm may be lifted and arcuately moved during the record changing cycle. Thus the rumble is imparted to the rear end of the tone arm 48.

The dynamic unbalance of the rotor together with the run-out or wobble of the drive shaft portion 28, imparts vibration to the idler wheel 25. This vibration is imparted to the turn table 23 and directly to the needle 50. Thus the rear end and the front end of the tone arm 48 are both being shaken at these low rumble frequencies but, of course, only by chance would they happen to be shaken in phase synchronism. As a practical matter they are out of synchronism and impart to the needle these annoying rumble vibration frequencies so that they are reproduced by the amplifier connected to the phonograph mechanism.

The prior art had several methods of assembly of small rotors and shafts for electric motors. A first prior art method was to have a complete interference or press fit between the shaft and the entire surface of the hole in the rotor. This method used either a plain shaft or one knurled or splined for the length of the rotor. The hole in the rotor was made slightly under size and the shaft was forced into the rotor hole by a press. The fact that the shaft was drawn through a hole smaller than its own diameter caused considerable twisting and bending of the shaft much like a hair being pulled through a hole smaller than its diameter, and resulted in very high internal stresses in the shaft. As a result the shaft was far from being straight speaking in terms of thousandths of an inch.

A second prior art method of assembly of small shafts and rotors attempted to prevent the bending of the shaft by the complete interference fit, and instead substituted an interference fit at only two localized areas. In this second method the hole in the rotor was made just slightly over size throughout its length so that the shaft initially had a slip fit with the rotor. Next the end plates of the rotor were staked to provide an interference fit between the rotor and the shaft only at the two ends of the rotor. The shaft might be either plain or knurled or splined at the areas of interference fit. A difficulty in this second method was that the hole in the rotor could never be made perfectly straight even though it was drilled and then reamed. In speaking of shaft diameters in the order of .180 inch and rotor length in the order of .750 inch this is a relatively long and slender shaft. The reamer necessarily has teeth on it to perform its reaming function and; therefore, the core of the reamer could not be more than about .150 inch. It might be in the order of two to three inches long and; therefore, the reamer was a long slender one which necessarily had flexibility. Therefore, if the hole was not straight to begin with before it was reamed the reamer would not take out all the curvature.

Figure 5:
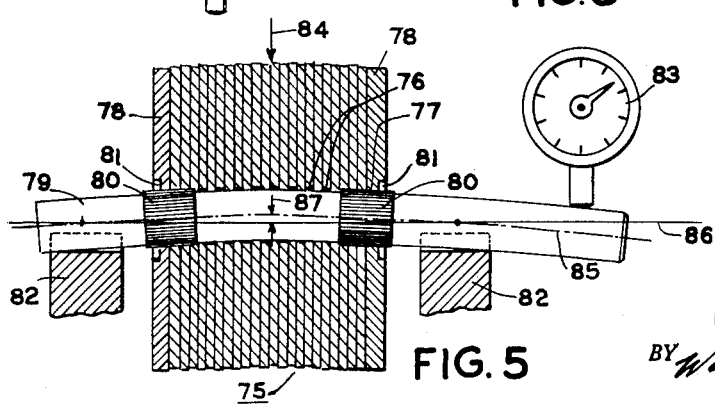
FIGURE 5 shows an enlarged longitudinal sectional view of a prior art rotor and shaft assembly.

A third prior art method of assembly of a shaft and rotor, again an attempted improvement over the other methods, was to use a system as shown in FIGURE 5. This structure has an interference fit between the shaft and rotor at only two principal areas. A rotor 75 has the hole 76 in the steel laminations slightly larger than the holes 77 in the copper or conductive end plates 78 which form part of the squirrel cage structure for the induction motor rotor. A shaft 79 has two knurled portions 80 and initially the holes are formed in the steel laminations to a slightly larger diameter than the holes in the conductive end plates 78. When the hole 76 is reamed to the proper diameter only the copper plates, plus the high spots of the steel laminations, are reamed to size. The shaft knurls 80 initially may have a slip fit with the end plate 78 or may have initially a small interference fit. Next the end plates 78 are staked at 81 to create a good interference fit between the shaft knurls 80 and the end plates 78. This method of assembly creates less stress and bending of the shaft compared to the complete interference fit of the first prior art method outlined above and it also has less chance of having a curved internal hole 76 than the second prior art method outlined above, but in production it still produces shaft and rotor assemblies wherein the shafts have a run-out in the out-board end of from .0020 to .0050 inch and even higher on many occasions. This run-out can be measured by placing the shaft and rotor assembly on V-block supports 82, spaced approximately where the motor bearings would be located and using an indicator 83 near the out-board end of the shaft.

The three above-mentioned prior art assembly methods produced so much distortion and bending of the shaft that it was common practice to attempt to restraighten the shafts after assembly in order that the run-out could be brought to within acceptable limits and also to help the dynamic balancing. This restraightening was commonly done by using a press to exert a force indicated at 84 while the shaft was carried in the V-block supports 82 and twirled by the operator while observing the run-out gauge 83. Whenever the gauge 83 showed a low spot, force was applied at 84 to attempt to restraighten the shaft so that the center line 85 of the shaft would lie on the true axis 86. The difficulty with this method was that the shaft had already been stressed out of its straight condition, and also that a force applied at 84 would not act on the shaft centrally between the knurls 80, but rather it acted on the shaft at the knurled portions which merely tended to form a reverse curvature in the shaft between the knurled portions and the V-block supports 82. This had some desired results of lessening the run-out but the run-out could rarely be brought back to less than .0005 inch and if by chance it was bent back to less than this amount it would not stay, because the shaft had not been made straight, it had merely been given a double reverse curve. First in importance was the fact that lateral forces on the shaft during subsequent assembly, shipment and use, moved the shaft out-board end relative to the rotor axis 86 and thus destroyed the closeness of run-out. It is important to note that in these prior art methods of assembly it was not necessary for any subsequent lateral force on the shaft to actually overcome the elastic limit of the shaft before the shaft could be changed in position. As shown in FIGURE 5 the shaft 79 has an interference fit at only two places and; therefore, the shaft could change in attitude relative to the rotor merely by slipping or skidding along the surface of the hole 76 as caused by application of a lateral force or even by application of an axial force such as caused by dropping of the package during shipment.

For many applications of electric motors it is relatively unimportant that the shaft might have a run-out of .005 or even .010 inch. For phonograph mechanisms, however, any amount of run-out or unbalance of the rotor is directly noticeable in the amount of rumble present in the phonograph assembly. One is concerned here with rotors weighing in the order of two to four ounces and; therefore, if the deviation of the shaft center line 85 from the axis 86 at the center of the rotor as shown at 87 is only .0001 inch, this means .0002 to .0004 ounce inch of unbalance force which is practically at the maximum desired. By the same token, a shaft bent this much at 87 will probably be out more than this at the out-board end of the shaft, as shown at the run-out gauge 83, and this run-out will produce more vibrations in the idler wheel 25 to thus add still more noise and rumble in the phonograph mechanism.

Applicant has determined that the way to keep the dynamic unbalance and the run-out within satisfactorily small limits both during initial rotor and shaft assembly and during subsequent assembly, shipment and use is to use the methods shown in FIGURES 1–4 wherein the shaft is made straight within specified manufacturing limits and then assembled in this straight condition without any distortion or stressing during assembly. The shaft of FIGURE 2 has life maximum diameter being that which is caused to engage the rotor 55. The shaft step 26 and the grooves 65, if these are desired, are cut on the shaft before the shaft is ground. The fact that the maximum diameter of the shaft is that which engages the rotor 55, permits the shaft 13 to be ground in a manner which is known as axial through feed grind. The shafts are fed axially through a centerless grinding machine to grind the entire length of the shaft thus obtaining a shaft which is free from any flats and straight within .0001 inch. In the prior art assembly methods, such as the shaft and rotor assembly of FIGURE 5 it was, of course, possible to regrind the shaft after assembly into the rotor and after the attempted restraightening operations. However, the only method possible for grinding was straddle grinding which meant that the shaft at the bearing portions was moved perpendicular to the shaft axis into the straddle grinder to grind these two shaft portions. The very fact that the rotor has high inertia relative to the shaft means that the initial application of grinding tended to place flats on the shaft until the rotor and shaft assembly got up to the speed of the grinding wheels. These flats were not diametrically opposite rather they were angularly placed because of the disposition of the grinding wheels. This regrinding still does not take out the initial stress in the shaft nor the reverse curvature and any subsequent shocks or stresses during subsequent assembly, shipment, or use was found to cause the shaft to change its attitude relative to the rotor to thus destroy both the dynamic balance and the run-out.

In the applicant's improved method of assembly as known in FIGURES 2–4 the shaft 13 has very close fit yet still being a slip fit with the rotor hole 60 and then the adhesive 68 securely fastens the shaft 13 to the rotor 55 without any stresses in the shaft. Therefore, before the shaft 13 can be moved from its proper assembly attitude relative to the rotor, the elastic limit of the shaft material must be exceeded and; therefore, the shaft and rotor assembly run true throughout life despite any shocks in subsequent shipment, assembly, and use.

A still further and unexpected benefit from this method of assembly has been that the dynamic balancing required on the shaft and rotor assembly is considerably reduced. Typically this dynamic balancing is done by rotating the shaft and rotor assembly, such as that shown in either FIGURE 4 or 5, on a dynamic balancing machine to determine the amount of unbalance force or couple, and then the rotor is drilled to an appropriate depth as at 90 and 91 in order to restore the dynamic balancing to the prescribed limits. While it has been found that the method of assembly of FIGURES 2–4 is more expensive than the prior art method of assembly an unexpected benefit has been achieved by the fact that less dynamic balancing is required by virtue of the fact that the amount of unbalance of the rotor assembly of FIGURE 4 is initially considerably less than the amount of unbalance of the prior art assembly of FIGURE 5.

With the present invention the shaft is not stressed during assembly since there is no interference fit. The shaft may, therefore, be ground and polished to be straight and true within .0002 inch of run-out and the entire rotor and shaft assembly of FIGURE 4 may be dynamically balanced to within .0002 ounce inch of unbalanced torque. Further and far more important is that to whatever degree of run-out and dynamic balancing the shaft and rotor assembly is manufactured, it will remain in that condition during the rest of the manufacture, during shipment and during use because there are no stresses built up in the shaft during assembly to be manifested by slight bending of the shaft subsequent to assembly.

An alternate method of assembly could be that the shaft step 26 and the locking groove 66, if either of these is desired, is cut in the shaft and then the shaft ground and polished to the desired straightness and surface finish. Chemical etch may be applied to the intermediate portion 64 to roughen this circumferential portion and in this case the roughening may take place after the grinding and polishing because with the chemical etch this will place no internal stresses in the shaft like the cutting of the annular grooves 65. Accordingly, this method of preparation and assembly permits this roughening before or after the grinding and polishing.

With this method of assembly, and with the article as assembled into the drive mechanism 11, results are accomplished which hitherto were not possible. The rumble in phonograph record changers has been reduced in the overall by 20 db to the point where it is no longer a problem and does not increase during use.

This application is a division of my co-pending application Serial No. 786,560, filed January 13, 1959.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The method of assembling a rotor on a shaft, comprising, forming an axial hole in said rotor, establishing a first portion of said shaft as other than cylindrical, grinding and polishing at least one end of said shaft to an outside diameter less than the inside diameter of said hole to have one end of said shaft and said first portion of said shaft readily pass through said hole, assembling said shaft and rotor and applying an adhesive between said first portion of said shaft and said rotor and retained therebetween by capillarity, and hardening said adhesive.

2. The method of assembling a shaft and a rotor having an axial hole, comprising, establishing a bearing surface on at least one end of said shaft, surface finishing at least one end of said shaft to an outside diameter less than the inside diameter of said hole to have one end of said shaft and a first portion of said shaft readily pass through said hole, applying an adhesive on one of said shaft first portion and rotor hole, assembling said shaft and rotor with said adhesive radially between said first portion of said shaft and said rotor and hardening said adhesive.

3. The method of assembling a rotor on a shaft, comprising, forming an axial hole in said rotor, roughening a portion of said shaft approximately equal in length to said rotor, grinding and polishing said shaft to an outside diameter only slightly less than the inside diameter of said hole in the order of .010 of an inch and preserving part of said roughened portion, assembling said shaft and rotor and applying an adhesive between said roughened shaft portion and said rotor and retained therebetween by capillarity, and hardening said adhesive.

4. The method of assembling a rotor on a shaft, comprising, forming an axial hole in said rotor, establishing at least a first portion of said shaft as other than cylindrical, grinding and polishing said shaft to form bearing means on said shaft which are coaxial within predetermined limits and to establish at least one end of said shaft and said first portion with an outside diameter less than the inside diameter of said hole, applying an adhesive on one of said rotor hole and said shaft, assembling said shaft and rotor with said adhesive therebetween which sets up to form an interfering fit between said first portion of said shaft and said rotor, and hardening said adhesive.

5. The method of assembling a rotor on a shaft, comprising, forming an axial hole in said rotor, roughening at least a portion of said shaft, grinding and polishing said shaft with an outside diameter less than the inside diameter of said hole to provide a small clearance therebetween less than .010 of an inch and preserving a part of said roughened portion, and assembling said shaft and rotor with fluid adhesive material therebetween retained by capillarity and which sets up to form an interfering fit between said roughened shaft portion and said rotor.

6. The method of assembling a shaft on a rotor of a given length, comprising, forming an axial hole in said rotor, establishing a non-cylindrical intermediate portion of said shaft approximately equal in length to said rotor and of a size and shape to be slidably received in said axial hole, grinding bearing portions on said shaft to an outside diameter less than the inside diameter of said hole and with a run out of less than .0005 inch per inch of length, assembling said shaft and rotor with a heat settable adhesive between said intermediate shaft portion and said rotor, and subjecting said assembly to a heated solvent for said adhesive to remove excess adhesive from the exterior of said assembly and to hasten the setting of said adhesive.

7. The method of assembling a shaft on a rotor of a given length, comprising, forming an axial hole in said rotor to a selected diameter, grinding said shaft to an outside diameter of .0018 to .0005 of an inch less than the inside diameter of said hole and roughening an intermediate portion of said shaft approximately equal in length to said rotor without stressing said shaft subsequent to grinding, assembling said shaft and rotor with a heat settable adhesive between said roughened shaft portion and said rotor, and subjecting said assembly to a vapor degrease solvent for said adhesive to remove excess adhesive from the exterior of said assembly and to hasten the setting of said adhesive.

8. The method of assembling a rotor on a shaft, comprising, forming an axial hole in said rotor, reaming said hole, roughening a portion of said shaft approximately equal in length to said rotor by forming groove means thereon, grinding said shaft to an outside diameter less than the inside diameter of said hole and with a run-out at the end of the shaft of less than .0005 inch, assembling said shaft and rotor with a heat settable adhesive between said roughened shaft portion and said rotor and with said adhesive retained by capillarity, and subjecting said assembly to a heated solvent for said adhesive to remove excess adhesive from the exterior of said assembly and to hasten the setting of said adhesive.

9. The method of assembling a shaft and a rotor made from an assembled stack of punched laminations which have rough holes from the punching, comprising, roughening a portion of said shaft approximately equal in length to the hole in the rotor stack by forming annular grooves therein of a given depth with lands therebetween, removing shaft material from said lands less than said given depth to finish said lands on said shaft to an outside diameter less than the inside diameter of said rotor hole, assembling said shaft and rotor with a liquid adhesive between said shaft roughened portion and said rotor hole with the adhesive being soluble by a given solvent and enhanceable in setting by heat, and subjecting said assembly to a heated quantity of said given solvent to remove excess adhesive from the exterior of said assembly and to hasten the setting of said adhesive.

10. The method of assembling a rotor on a shaft, comprising, forming an axial hole in said rotor,
- machining at least one end of said shaft and a shaft first portion to an outside diameter slightly less than the inside diameter of said hole to have one end of said shaft and said first portion of said shaft readily pass through said hole,
- providing an abutment on said shaft for said rotor between said one end and said first portion,
- assembling said shaft and rotor with said abutment engaging one end of said rotor to axially position said shaft first portion within said rotor hole and applying an adhesive between said shaft first portion and said rotor,
- said adhesive being retained between said shaft first portion and said rotor by capillarity,
- and hardening said adhesive while retaining said abutment in engagement with said rotor.

References Cited in the file of this patent
UNITED STATES PATENTS

| | | |
|---|---|---|
| 1,614,603 | Dewise | Jan. 18, 1927 |
| 2,060,680 | Linse | July 23, 1932 |
| 2,152,918 | Reis | Apr. 4, 1939 |
| 2,213,724 | Vogel | Sept. 3, 1940 |
| 2,255,184 | Osenberg | Sept. 9, 1941 |
| 2,380,287 | Baumbach | July 10, 1945 |
| 2,423,345 | Roters | July 1, 1947 |
| 2,577,818 | Shaw | Dec. 11, 1951 |
| 2,696,567 | Madle | Dec. 7, 1954 |
| 2,804,322 | Herzog | Apr. 27, 1957 |
| 2,818,517 | Loosjes | Dec. 31, 1957 |
| 2,822,609 | Horvitz | Feb. 11, 1958 |
| 3,068,563 | Reverman | Dec. 18, 1962 |